July 13, 1948.    F. T. NEWELL    2,445,151
PIPE COUPLING
Filed Dec. 19, 1944    2 Sheets-Sheet 2

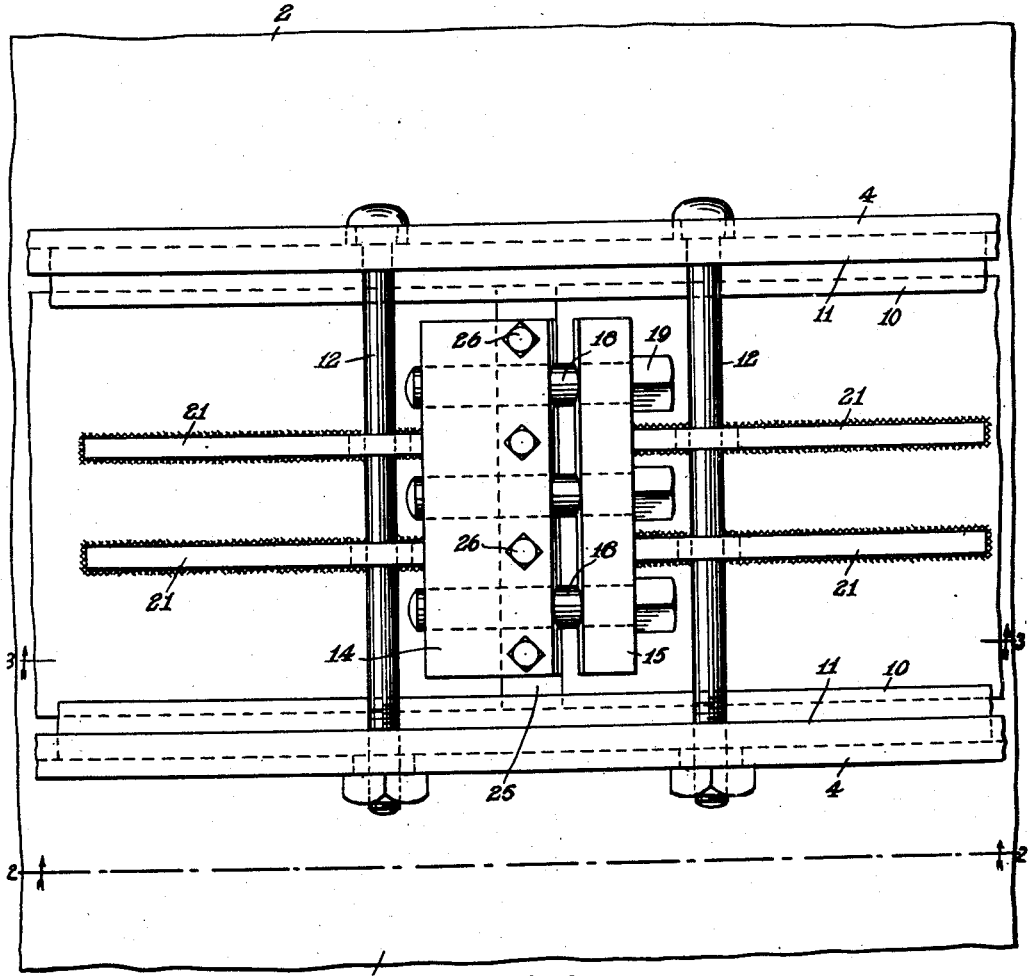
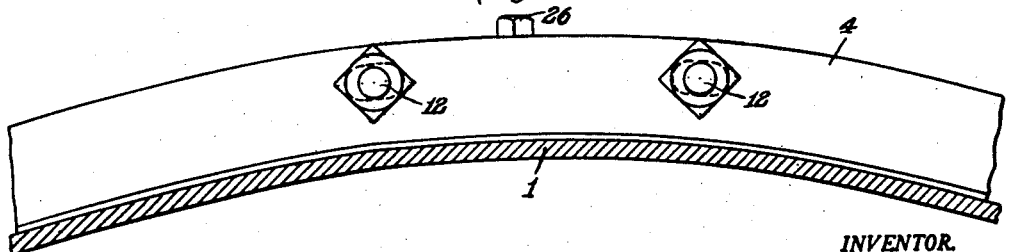

INVENTOR.
FREDERICK T. NEWELL
BY
Robert E. Brown
ATTORNEY.

Patented July 13, 1948

2,445,151

UNITED STATES PATENT OFFICE 2,445,151

PIPE COUPLING

Frederick T. Newell, Bradford, Pa., assignor to Dresser Industries, Inc., Cleveland, Ohio, a corporation of Pennsylvania Application December 19, 1944, Serial No. 568,804

6 Claims. (Cl. 285—142)

1

The present invention relates to pipe couplings and particularly to couplings for use on plain end large diameter pipes. The expression "large diameter" generally refers to sizes approximately four feet and larger, although certain features of the invention are applicable to smaller sizes, such as pipe two or three feet in diameter.

The development of a suitable coupling for use on large diameter pipe has for a long time been a major research problem. Large diameter pipe is customarily made in wall thicknesses which do not increase proportionally to the diameter insofar as structural strength and rigidity are concerned. Therefore, generally speaking, the greater the diameter, the greater the tendency of the pipe to become distorted under given field conditions. In fact the weight of the pipe itself lying horizontally on the ground may be sufficient to cause distortion of an amount excessive for satisfactory performance of standard pipe couplings of the usual rigid construction. It will be understood that other conditions encountered in the field, such for example, as earth loads and stresses resulting from thermal expansion and contraction, may produce still greater distortion of the pipe.

A further difficulty arises from the fact that the manufacture of large diameter pipe involves serious problems in maintaining accuracy of size and roundness at the mill. The resulting variations and irregularities in the size and shape of the pipe make it still more difficult to obtain a dependable fluid tight joint with the pipe couplings heretofore available.

It is an object of the present invention to provide a pipe coupling that can be used successively on large diameter pipe made in accordance with existing standards. Another object of my invention is to provide a satisfactory coupling for use on pipe having a relatively thin wall in proportion to its diameter so that the wall of the pipe is flexible and subject to distortion by the stresses encountered in use. A further object of my invention is to provide a pipe coupling that will insure a satisfactory and lasting fluid tight joint despite irregularities in the size and roundness of the pipe.

In accordance with the present invention, it has been found that the problem of providing a satisfactory coupling that will meet satisfactorily the difficult conditions and requirements referred to above can best be solved by making the coupling substantially as flexible as the pipe and providing an adjustable fit of the coupling to the pipe, so that the coupling will be distorted in

2 the same manner as the pipe and thus always make a substantially close fit throughout the circumference. By thus conforming to any irregularities in the circumferential size and shape of the pipe, whether resulting from inaccuracy in manufacture or from the flexibility and distortion of the pipe wall, the coupling, in accordance with the present invention, assures a dependable pipe joint at all times.

Other objects and advantages of my invention will appear from the following description and claims, in conjunction with the accompanying drawings, which illustrate by way of example, one embodiment of the invention.

In the drawings,

Fig. 1 is a fragmentary plan view showing a coupling in accordance with my invention applied to the adjoining ends of two pipe sections.

Fig. 2 is a sectional view taken approximately on the line 2—2 in Fig. 1.

Figure 6:
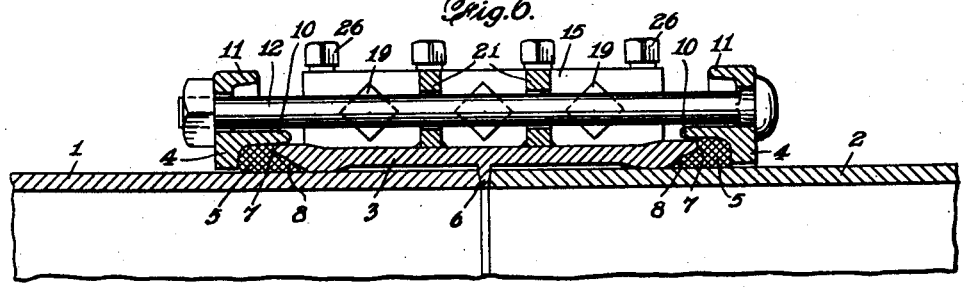
Fig. 6 is a sectional view taken approximately on the line 6—6 in Fig. 3.

A pipe coupling embodying my invention is shown by way of example in the drawings as a coupling for joining the ends of large diameter plain end pipe, the end portions 1 and 2 of the pipe sections being shown to illustrate the way in which the coupling is applied to the pipe. The coupling comprises a middle ring 3 (Fig. 6) extending around the pipe, a follower ring 4, on each side of the middle ring, and annular gaskets 5 between the follower ring and the middle ring. The middle ring is preferably provided with an inwardly projecting flange or series of projections 6, adapted to engage the ends of the pipe sections 1 and 2, to assure proper positioning of the middle ring with respect to the ends of the pipe. The side edges of the middle ring are suitably shaped, for example, by being flared or beveled, as indicated at 7, to provide annular gasket spaces or recesses for the gasket 5 between the middle ring, the follower rings and the pipe. The cross section of the annular gasket 5 is shaped to conform approximately to the cross section of the gasket recesses. Thus in the embodiment shown in the drawings, the gasket is formed with a tapered or wedge shaped portion 8 adapted to be pressed into the space between the edge of the middle ring and the wall of the pipe.

Each of the follower rings 4 has an inner flange portion 10 which cooperates in forming the gasket recess and an outer flange portion 11. The follower rings are connected by a plurality of through bolts 12 for drawing the follower rings toward one another and toward the middle ring 3, to apply sealing pressure to the annular gaskets 5.

Figure 3:
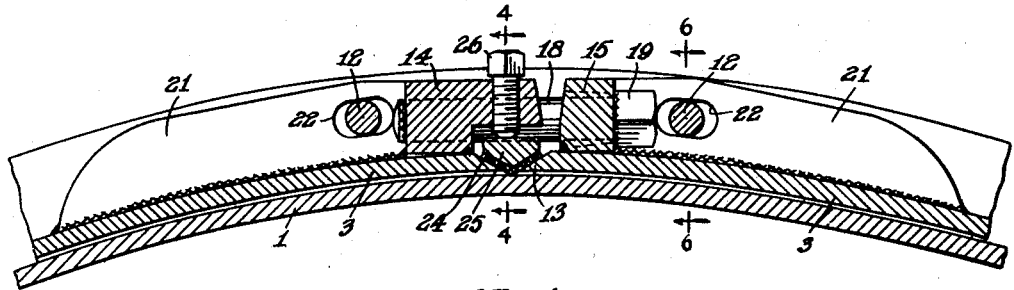
Fig. 3 is a sectional view taken approximately on the line 3—3 of Fig. 1.
Figure 5:
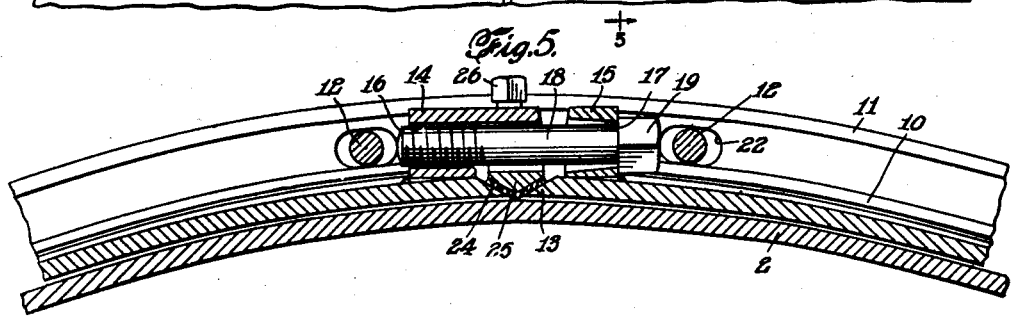
Fig. 5 is a sectional view taken approximately on the line 5—5 in Fig. 4.

The middle ring 3 is of flexible construction and is split transversely at a single point in its circumference. In referring to the middle ring being split transversely of its circumference, it will be understood that the ring may be split at approximately right angles to its circumference as shown in the drawings, or at such other angles as is desired. The ends of the split middle ring are inclined or beveled so that they diverge outwardly from one another, as shown at 13 in Fig. 3 and Fig. 5. The inclined surface, although shown as a flat bevel, may be concave or convex if desired. Adjacent its end portions the split middle ring is provided with outwardly projecting portions shown in the form of transversely extending bars or flanges, 14 and 15. It will be seen that the bars, 14, 15, are set back a short distance from the ends of the ring so that the beveled end portions 13 are unobstructed. The transverse bars 14, 15 are provided with aligned holes 16 and 17 to receive tangential bolts 18 which extend between the bars and are adapted to be tightened to draw the ends of the ring toward one another. The term "bolts" is used in the specification and claims to include equivalent fastening devices such as bolts and nuts, stud bolts, cap screws, etc. In the embodiment shown by way of example in the drawings, the holes 16 in the drawbar 14 are suitably threaded. The bolts 18 having heads 19 pass through the unthreaded holes 17 in the other transverse bar 15 and screw into the threaded holes 16. It will be seen that the bolts 18 in conjunction with the bars or lugs 14 and 15 thus provide adjustable means for drawing the ends of the split middle ring toward one another. Owing to the flexibility of the middle ring it is thereby drawn into conformity with the pipe throughout its circumference, so that it fits the pipe closely and provides uniform gasket recesses for the annular gaskets 5. Moreover, when the split middle ring is drawn up tight by means of the tangential bolts 18, the ends of the two pipe sections 1 and 2 are pulled into alignment and the two ends, which because of the flexibility of the pipe wall or variations in manufacture, may be out of round in different respects, are made to conform more closely with one another.

The middle ring is preferably substantially as flexible as the wall of the pipe. Because of its flexibility and adjustability the middle ring conforms to the pipe when installed thereon and bends with the pipe in any subsequent flexing of the pipe wall, for example, due to earth loads, line pressure or other causes. A tight and permanently sealed pipe joint is thus provided under all conditions.

To avoid concentration of stresses and local distortion of the middle ring by the bending moment imposed by the hold of the tangential bolts 18 on the drawbars 14, 15, there are preferably provided a plurality of webs or gussets 21 (Fig. 1), which extend rearwardly from the drawbars 14, 15 and project outwardly from the middle ring, being united with the bars and the body portion of the ring, for example by welding. The gussets 21 distribute the stresses resulting from the pull of the bolts on the drawbars and prevent distortion of the end portions of the middle ring. The gussets are shown with elongated holes 22 (Fig. 5) for the through bolts 12 extending between the follower rings adjacent the split in the middle ring 3.

While the adjustability of the flexible middle ring 3 by means of the drawbars 14, 15 and the tangential bolts 18 insures alignment of the pipe ends and close conformity of the middle ring with the pipe, it raises a difficult problem of providing a fluid tight seal at the split in the middle ring. To obtain a satisfactory fluid tight pipe joint with the coupling it is necessary not only to provide a seal between the ends of the split middle ring, but also to insure continuity of the seal between the middle ring and the annular gaskets 5 in the locality of the split. The problem is made still more difficult by the fact that the space or distance between the two ends of the split middle ring varies with each pipe joint, for example, by reason of variation in the circumference of pipe of the same nominal diameter, and may even vary slightly in the transverse extent of the middle ring.

In accordance with the present invention, this problem is successfully solved by beveling the ends of the split middle ring as described above, to provide an approximately V-shaped space between the ends of the ring, and adjustably pressing a V-shaped gasket into sealing contact with the beveled ends. The term "V-shaped" is used in a generic sense, it being understood that the sides of the V may be concave or convex instead of straight, and that they may diverge at any desired angle. In the particular embodiment shown by way of example in the drawings, the sides of the V form an obtuse angle to one another, so that the cross section of the space between the beveled ends of the ring is in the form of a rather open or flattened V. Moreover, it will be understood that when the ends of the ring are spaced farther apart than shown in the drawings, they will be separated from one another so that the inner portion of the V will be formed by the wall of the pipe and will be flat in cross section instead of pointed.

Figure 4:
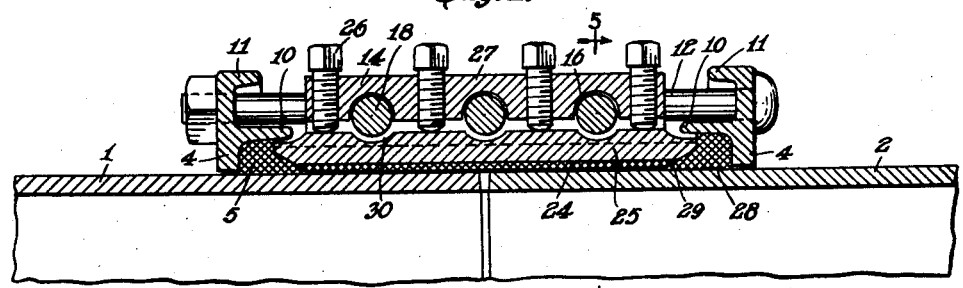
Fig. 4 is a sectional view taken approximately on the line 4—4 in Fig. 3.

The transversely extending gasket 24 for sealing the split in the middle ring is shown in the form of a strip of sheet packing material which is pressed into sealing engagement with the beveled ends of the middle ring by a transversely extending follower bar 25 (Figs. 3 and 5), having a V-shaped nose portion conforming approximately to the contour of the packing. The follower bar 25 is pressed inwardly to apply sealing pressure to the packing by means of a plurality of set screws 26 anchored in a tangentially projecting flange 27 provided on one of the transverse drawbars 14, and having threaded holes to receive the set screws. The ends of the transverse follower bar 25 are beveled as indicated at 28 (Fig. 4), to conform to the shape of the side edges of the middle ring forming the gasket recesses for the annular gaskets 5. The ends of the transversely extending gasket 24 are also beveled as indicated at 29 to conform to the shape of the gasket recess. The transverse gasket 24 and follower bar 25, in conjunction with the middle ring, thus provide a continuous gasket engaging surface for the annular gasket 5. When the through bolts 12 are drawn up to draw the follower rings 4 toward one another, the annular gaskets 5 are pressed into sealing engagement with the middle ring and also with the ends of the transversely extending gasket 24 and the follower bar 25, which provide a fluid tight seal for the split in the middle ring. As shown in Fig. 4, the transverse follower bar 25 is properly positioned transversely of the middle ring not only by engagement of its ends with the annular gaskets 5, but also by notches 30 which are provided in the upper surface of the bar to accommodate the tangential bolts 18 (Fig. 4).

Instead of being formed of sheet material as shown, the transverse gasket 24 for sealing the split in the middle ring, may be of triangular or other shape adapted to be pressed into sealing contact with the beveled end edges of the middle ring, the follower bar 25 being in this event suitably shaped to provide sealing pressure.

In the manufacture of the coupling, the middle ring, in accordance with the present invention, is produced by forming a straight strip of metal to the finished cross section of the middle ring, for example, by machining or rolling the strip. The strip is then rolled into a ring. Since the ends of the ring are not welded together, a split ring being desired, the manufacture of the ring is simple and economical. The drawbars 14 and 15 may be formed integrally with the middle ring or may, as shown in the drawings, be separately formed of suitable stock and welded to the body portion of the middle ring. The gussets 21 are also shown as being welded to the body portion of the middle ring and to the transverse drawbars 14 and 15. There is thus provided a simple structure that is economical to manufacture.

The pipe coupling, in accordance with my invention, is installed by loosely assembling the parts of the coupling in proper position on the pipe. The tangential bolts 18 are then tightened to draw the middle ring 3 into conformity with the pipe and to draw the ends of the two pipe sections into alignment. As the ends of the split middle ring are drawn toward one another by the tangential bolts or screws 18, the packing member 24 and follower bar 25 automatically adjust themselves by being forced radially outward by the beveled end surfaces of the middle ring. When the middle ring is fully adjusted, the packing screws 26 are tightened to seal the split. The through bolts 12 are then tightened to draw the follower rings 4 toward one another and apply sealing pressure to the annular gaskets 5.

It has been found by tests that when collapsing loads such as earth loads are imposed on the pipe subsequent to assembly of the joint, the entire coupling will "follow" the pipe distortion very closely up to any amount that can reasonably be expected under normal service conditions notwithstanding the fact that the followers which are not adjustable in the embodiment shown in the drawings are relatively stiff in a radial direction. The edge portions of the middle ring confined within the inner flange portions 10 of the follower rings force the latter to bend or flex in the same manner as the pipe and the middle ring themselves. If still greater flexibility and adjustability are desired, it can be obtained by using circumferentially adjustable sectional follower rings in conjunction with the flexible and adjustable middle ring described and shown.

By thus conforming to the pipe under all conditions ordinarily encountered in service, the coupling, in accordance with the present invention, assures an effective and lasting fluid tight seal.

What I claim and desire to secure by Letters Patent is:

1. A pipe coupling comprising a flexible middle ring split transversely of its circumference and having its adjacent ends beveled to provide a V-shaped space between said ends, means for drawing the ends of the middle ring toward one another to draw said ring into close conformity with the pipe surface around its circumference, a V-shaped gasket, means for pressing said gasket into the V-shaped space between the ends of the middle ring and into sealing engagement with said ends, a follower ring on each side of said middle ring, annular gaskets between said middle ring and follower rings, and means for drawing said follower rings toward said middle ring to apply sealing pressure to said annular gaskets.

2. In a pipe coupling, a flexible middle ring split transversely of its circumference and having its adjacent ends beveled in opposite directions to provide an outwardly opening V-shaped space between said ends, means for drawing the ends of the middle ring toward one another to draw said ring into conformity with the pipe, a gasket overlying the end portions of said ring and extending transversely of the ring, and a V-shaped follower for pressing said gasket into said V-shaped space and into sealing engagement with the end portions of said ring.

3. In a pipe coupling, a flexible middle ring split transversely of its circumference and having its adjacent ends beveled to provide an outwardly diverging space between said ends, opposed lug portions projecting outwardly from said ring adjacent the ends thereof, bolts extending between said lug portions for drawing the ends of the ring toward one another to draw said flexible ring into conformity with the pipe surface, a gasket overlying the end portions of said ring and extending transversely of the ring, and a gasket follower for pressing said gasket into the space between the beveled ends of the ring and into sealing engagement with said ends.

4. In a pipe coupling comprising a middle ring split transversely of its circumference, means for adjustably drawing the ends of the split ring toward one another, spaced annular gaskets for forming a seal between the middle ring and the pipe, and annular followers for applying sealing pressure to the annular gaskets, said middle ring being sufficiently flexible to accommodate itself to an out of round pipe, a gasket for forming a seal between the ends of the split middle ring and a gasket follower adapted to exert a force in an approximately radial direction to apply sealing pressure to said last mentioned gasket.

5. In a pipe coupling comprising a middle ring split transversely of its circumference, means for adjustably drawing the ends of the split ring toward one another, spaced annular gaskets for forming a seal between the middle ring and the pipe, and annular followers for applying sealing pressure to the annular gaskets, said middle ring being sufficiently flexible to accommodate itself to an out of round pipe, a gasket for forming a seal between the ends of the split middle ring, a follower for said gasket and means for actuating said follower to apply sealing pressure to said last mentioned gasket, said actuating means acting independently of the means for adjustably drawing the ends of the gasket ring toward one another to apply correct sealing pressure irrespective of the adjusted position of said ends circumferentially of the pipe.

6. In a pipe coupling comprising a unitary middle ring, spaced annular gaskets for forming a seal between the middle ring and the pipe, and annular followers for applying sealing pressure to the annular gaskets, said middle ring being split transversely of its circumference at one point only and being sufficiently flexible to accommodate itself to an out of round pipe, means for drawing the ends of the ring adjustably toward one another to draw said flexible split ring into close conformity with the pipe surface substantially throughout its circumference, gusset portions extending back a substantial distance from the ends of said ring to provide local stiffening of said otherwise flexible ring and to distribute the stress applied by the pull of said means for drawing the ends of the ring together, and means for forming a pressure tight seal between the ends of said split middle ring comprising a transversely extending gasket and means for applying substantially uniform pressure to said gasket irrespective of the adjusted position of the ends of the middle ring circumferentially of the pipe.

FREDERICK T. NEWELL.

REFERENCES CITED

The following references are of record in the file of this patent:

UNITED STATES PATENTS

| Number | Name | Date |
|---|---|---|
| 664,263 | Gorringe et al. | Dec. 18, 1900 |
| 1,877,094 | Walborn | Sept. 13, 1932 |
| 1,940,729 | Pfeferle | Dec. 26, 1933 |
| 2,140,939 | Merrill | Dec. 20, 1938 |